United States Patent
Zhang (10) Patent No.: US 9,815,347 B2
(45) Date of Patent: Nov. 14, 2017

(54) AIR CONDITIONED OBJECT IN THE INTERIOR OF A MOTOR VEHICLE WITH A SWITCHING DEVICE

(75) Inventor: Jonathan Zhang, Tianjin (CN)

(73) Assignee: GENTHERM GMBH, Odelzhausen (DE)

( * ) Notice: Subject to any disclaimer, the term of this patent is extended or adjusted under 35 U.S.C. 154(b) by 1027 days.

(21) Appl. No.: 12/725,942

(22) Filed: Mar. 17, 2010

(65) Prior Publication Data

US 2010/0240292 A1    Sep. 23, 2010

(30) Foreign Application Priority Data

Mar. 18, 2009 (DE) .......... 10 2009 013 452
Jun. 24, 2009 (DE) .......... 10 2009 030 491

(51) Int. Cl.
*B60H 1/26* (2006.01)
*B60H 1/00* (2006.01)
*B60N 2/56* (2006.01)

(52) U.S. Cl.
CPC ......... *B60H 1/00564* (2013.01); *B60N 2/565* (2013.01); *B60N 2/5642* (2013.01); *B60N 2/5657* (2013.01)

(58) Field of Classification Search
CPC ....................................... B60H 1/26
USPC .................................. 454/75, 120
See application file for complete search history.

(56) References Cited

U.S. PATENT DOCUMENTS

| 1,936,960 A | 11/1933 | Bowman |
| 2,022,959 A | 12/1935 | Gordon |
| 2,158,801 A | 5/1939 | Petterson |
| 2,912,832 A | 11/1959 | Clark |
| 2,931,286 A | 4/1960 | Fry, Sr. et al. |
| 2,978,972 A * | 4/1961 | Hake .............................. 454/120 |
| 2,992,604 A | 7/1961 | Trotman et al. |
| 3,030,145 A | 4/1962 | Kittermann |
| 3,127,931 A | 4/1964 | Johnson |
| 3,127,934 A | 4/1964 | McGrath |
| 3,653,589 A | 4/1972 | McGrath |

(Continued)

FOREIGN PATENT DOCUMENTS

| DE | 41 12 631 | 4/1992 |
| DE | 411375 | 5/1994 |

(Continued)

OTHER PUBLICATIONS

Excerpt from website http://www.seatcomfort.com/ semashow1.htm, Specializing in Seat Ventilation and Heating Systems, Seat Comfort Systems Unveils 3 New Seat Heater Products.

(Continued)

*Primary Examiner* — Steven B McAllister
*Assistant Examiner* — Samantha Miller
(74) *Attorney, Agent, or Firm* — The Dobrusin Law Firm, P.C.

(57) ABSTRACT

The present invention relates to an air conditioner with at least one air conduction device and a switching device. Provision is made that in a first operating state, the air conditioner has air passing at least partially through it in a first direction, that the air conditioner has air flowing through it at least partially in a second direction different from the first direction, and that the air conditioner has at least one switching device, to alter the flow direction of the air in the air conduction device.

15 Claims, 5 Drawing Sheets

(56) References Cited

U.S. PATENT DOCUMENTS

| | | | |
|---|---|---|---|
| 3,684,170 A | 8/1972 | Roof | |
| 4,065,936 A | 1/1978 | Fenton et al. | |
| 4,259,896 A * | 4/1981 | Hayashi et al. | 454/120 |
| 4,665,707 A | 5/1987 | Hamilton | |
| 4,679,411 A * | 7/1987 | Pearse, Jr. | 62/519 |
| 4,777,802 A | 10/1988 | Feher | |
| 4,905,475 A | 3/1990 | Tuomi | |
| 4,981,324 A | 1/1991 | Law | |
| 5,002,336 A | 3/1991 | Feher | |
| 5,102,189 A | 4/1992 | Saito et al. | |
| 5,117,638 A | 6/1992 | Feher | |
| 5,187,943 A | 2/1993 | Taniguchi et al. | |
| 5,385,382 A | 1/1995 | Single, II et al. | |
| 5,450,894 A * | 9/1995 | Inoue et al. | 165/43 |
| 5,524,439 A | 6/1996 | Gallup et al. | |
| 5,626,021 A * | 5/1997 | Karunasiri et al. | 62/3.5 |
| 5,645,314 A | 7/1997 | Liou | |
| 5,921,100 A * | 7/1999 | Yoshinori et al. | 62/244 |
| 5,921,314 A | 7/1999 | Schuller et al. | |
| 5,924,766 A | 7/1999 | Esaki et al. | |
| 6,048,024 A | 4/2000 | Wallman | |
| 6,059,018 A * | 5/2000 | Yoshinori et al. | 165/42 |
| 6,062,641 A | 5/2000 | Suzuki et al. | |
| 6,064,037 A | 5/2000 | Weiss et al. | |
| 6,068,332 A | 5/2000 | Faust et al. | |
| 6,079,485 A | 6/2000 | Esaki et al. | |
| 6,085,369 A | 7/2000 | Feher | |
| 6,105,667 A * | 8/2000 | Yoshinori et al. | 165/202 |
| 6,109,688 A | 8/2000 | Wurz et al. | |
| 6,119,463 A | 9/2000 | Bell | |
| 6,124,577 A | 9/2000 | Fristedt | |
| 6,145,925 A | 11/2000 | Eksin et al. | |
| 6,147,332 A | 11/2000 | Holmberg et al. | |
| 6,164,719 A | 12/2000 | Rauh | |
| 6,179,706 B1 | 1/2001 | Yoshinori et al. | |
| 6,186,592 B1 | 2/2001 | Orizaris et al. | |
| 6,189,966 B1 | 2/2001 | Faust et al. | |
| 6,196,627 B1 | 3/2001 | Faust et al. | |
| 6,223,539 B1 | 5/2001 | Bell | |
| 6,224,150 B1 | 5/2001 | Eksin et al. | |
| 6,237,675 B1 | 5/2001 | Oehring et al. | |
| 6,254,179 B1 | 7/2001 | Kortume et al. | |
| 6,263,530 B1 | 7/2001 | Feher | |
| 6,273,810 B1 | 8/2001 | Rhodes et al. | |
| 6,277,023 B1 | 8/2001 | Schwarz | |
| 6,278,090 B1 | 8/2001 | Fristedt et al. | |
| 6,291,803 B1 | 9/2001 | Fourrey | |
| 6,300,150 B1 | 10/2001 | Venkatasubramanian | |
| 6,321,996 B1 * | 11/2001 | Odebrecht et al. | 237/12.3 A |
| 6,415,501 B1 | 7/2002 | Schlesselman | |
| 6,425,637 B1 | 7/2002 | Perterson | |
| 6,434,328 B2 | 8/2002 | Rutherford | |
| 6,478,369 B1 | 11/2002 | Aoki et al. | |
| 6,481,801 B1 | 11/2002 | Schmale | |
| 6,483,087 B2 | 11/2002 | Gardner et al. | |
| 6,491,578 B2 | 12/2002 | Yoshinori et al. | |
| 6,497,275 B1 | 12/2002 | Elliot | |
| 6,501,055 B2 | 12/2002 | Rock et al. | |
| 6,505,886 B2 * | 1/2003 | Gielda et al. | 297/180.13 |
| 6,511,125 B1 | 1/2003 | Gendron | |
| 6,541,737 B1 | 4/2003 | Eksin et al. | |
| RE38,128 E | 6/2003 | Gallup et al. | |
| 6,578,910 B2 | 6/2003 | Andersson et al. | |
| 6,592,181 B2 | 7/2003 | Stiller et al. | |
| 6,604,785 B2 | 8/2003 | Bargheer et al. | |
| 6,606,866 B2 | 8/2003 | Bell | |
| 6,619,736 B2 | 9/2003 | Stowe et al. | |
| 6,625,990 B2 | 9/2003 | Bell | |
| 6,626,386 B1 | 9/2003 | Stiner et al. | |
| 6,626,455 B2 | 9/2003 | Webber et al. | |
| 6,626,488 B2 | 9/2003 | Pfahler | |
| 6,629,724 B2 | 10/2003 | Ekern et al. | |
| 6,629,725 B1 | 10/2003 | Kunkel et al. | |
| 6,642,444 B2 | 11/2003 | Hagiwara et al. | |
| 6,664,518 B2 | 12/2003 | Fristedt et al. | |
| 6,676,207 B2 | 1/2004 | Rauh et al. | |
| 6,682,140 B2 | 1/2004 | Minuth et al. | |
| 6,685,553 B2 | 2/2004 | Aoki | |
| 6,687,937 B2 | 2/2004 | Harker | |
| 6,719,534 B2 | 4/2004 | Aoki et al. | |
| 6,719,624 B2 | 4/2004 | Hayashi et al. | |
| 6,722,148 B2 | 4/2004 | Aoki et al. | |
| 6,761,399 B2 | 7/2004 | Bargheer et al. | |
| 6,767,621 B2 | 7/2004 | Flick et al. | |
| 6,786,541 B2 | 9/2004 | Haupt et al. | |
| 6,786,545 B2 | 9/2004 | Bargheer et al. | |
| 6,793,016 B2 * | 9/2004 | Aoki et al. | 165/202 |
| 6,808,230 B2 | 10/2004 | Buss et al. | |
| 6,817,675 B2 | 11/2004 | Buss et al. | |
| 6,826,792 B2 | 12/2004 | Lin | |
| 6,828,528 B2 | 12/2004 | Stöwe et al. | |
| 6,848,742 B1 | 2/2005 | Aoki et al. | |
| 6,869,139 B2 | 3/2005 | Brennan et al. | |
| 6,869,140 B2 | 3/2005 | White et al. | |
| 6,871,696 B2 * | 3/2005 | Aoki et al. | 165/43 |
| 6,886,352 B2 | 5/2005 | Yoshinori et al. | |
| 6,892,807 B2 | 5/2005 | Fristedt et al. | |
| 6,893,086 B2 | 5/2005 | Bajic et al. | |
| 6,929,322 B2 | 8/2005 | Aoki et al. | |
| 6,957,545 B2 | 10/2005 | Aoki | |
| 6,976,734 B2 | 12/2005 | Stoewe | |
| 7,013,653 B2 | 3/2006 | Toshifumi et al. | |
| 7,040,710 B2 | 5/2006 | White et al. | |
| 7,052,091 B2 | 5/2006 | Bajic et al. | |
| 7,070,232 B2 | 7/2006 | Takeshi et al. | |
| 7,083,227 B2 | 8/2006 | Brennan et al. | |
| 7,114,771 B2 | 10/2006 | Lofy et al. | |
| 7,131,689 B2 | 11/2006 | Brennan et al. | |
| 7,147,279 B2 | 12/2006 | Bevan et al. | |
| 7,168,758 B2 | 1/2007 | Bevan et al. | |
| 7,231,772 B2 | 6/2007 | Bell et al. | |
| 7,290,759 B1 | 11/2007 | Lavrencik | |
| 7,306,283 B2 | 12/2007 | Howick et al. | |
| 7,338,117 B2 | 3/2008 | Iqbal et al. | |
| 7,356,912 B2 | 4/2008 | Iqbal et al. | |
| 7,370,911 B2 | 5/2008 | Bajic et al. | |
| 7,827,805 B2 | 11/2010 | Comiskey | |
| 7,828,050 B2 * | 11/2010 | Esaki | 165/202 |
| 8,888,573 B2 * | 11/2014 | Bajic et al. | 454/120 |
| 2005/0066505 A1 | 3/2005 | Iqbal et al. | |
| 2006/0138810 A1 | 6/2006 | Knoll et al. | |
| 2007/0001507 A1 | 1/2007 | Brennan et al. | |
| 2007/0214800 A1 * | 9/2007 | Kadle et al. | 62/3.3 |
| 2008/0119125 A1 * | 5/2008 | Guerreiro | 454/75 |
| 2009/0031742 A1 * | 2/2009 | Seo et al. | 62/244 |

FOREIGN PATENT DOCUMENTS

| | | |
|---|---|---|
| DE | 19654370 | 3/1998 |
| DE | 19805174 | 6/1999 |
| DE | 198 10 936 | 9/1999 |
| DE | 199 54 978 | 1/2001 |
| DE | 10144839 | 3/2003 |
| DE | 10316732 | 10/2004 |
| DE | 10346064 | 4/2005 |
| DE | 102004046354 A1 | 5/2005 |
| DE | 102004048448 A1 | 5/2005 |
| DE | 199 54 978 | 1/2011 |
| EP | 411375 | 5/1994 |
| EP | 0809576 | 5/1999 |
| EP | 1088696 | 9/2000 |
| EP | 1050429 | 11/2000 |
| EP | 1123834 | 2/2001 |
| EP | 1266794 | 12/2002 |
| EP | 1 075 984 | 5/2003 |
| EP | 1 078 984 | 5/2003 |
| FR | 1266925 | 9/1960 |
| FR | 2630056 | 10/1989 |
| JP | 10044756 | 2/1998 |
| JP | 2002234332 | 8/2002 |
| JP | 2003042594 | 2/2003 |
| WO | 97/09908 | 3/1997 |
| WO | 03/051666 | 6/2003 |
| WO | 03/077710 | 9/2003 |

(56) References Cited

FOREIGN PATENT DOCUMENTS

| WO | 04/091967 | 10/2004 |
| WO | 2004/091967 | 10/2004 |
| WO | 04/096601 | 11/2004 |
| WO | 2004/096601 | 11/2004 |
| WO | 05/021320 | 3/2005 |
| WO | 2005/021320 | 3/2005 |
| WO | 05/068253 | 7/2005 |
| WO | 2005/068253 | 7/2005 |
| WO | 05/110806 | 11/2005 |
| WO | 2005/110806 | 11/2005 |

OTHER PUBLICATIONS

GMT 830 Heating & Ventilation System, IGB Automotive Ltd., received by Assignee W.E.T. Automotive Systems, Jun. 2003.
Automotive Heated Seats—Heated Steering Wheels, IGB Automotive Ltd., received by Assignee W.E.T. Automotive Systems, May 2003.
Automotive Seat Heating Systems, Bauerhin International, received by Assignee W.E.T. Automotive Systems, May 2002.
Excerpt from website http://www.seatcomfort.com/semashowl.htm, Specializing in Seat Ventilation and Heating Systems, Seat Comfort Systems Unveils 3 New Seat Heater Products.
GMT 830 Heating & Ventilation Systems, IGB Automotive Ltd., received by Assignee W.E.T. Automotive Systems, Jun. 2003.
German Office Action, Serial No. 102009030491.6-16, dated Jul. 15, 2009, pp. 1-4.

\* cited by examiner

Fig. 6B

AIR CONDITIONED OBJECT IN THE INTERIOR OF A MOTOR VEHICLE WITH A SWITCHING DEVICE

CLAIM OF PRIORITY

The present application claims priority to German Applications DE 10 2009 013 452.2 filed Mar. 18, 2009 and DE 10 2009 030 491.6 filed Jun. 24, 2009, hereto incorporated by reference.

FIELD OF THE INVENTION

An object as per the present invention is an air conditioner with a switching device, more particularly with an air conditioner with a switching device for conditioning zones to be air-conditioned of a vehicle seat.

BACKGROUND OF THE INVENTION/PRIOR ART

It is expected of such devices that they operate as efficiently as possible, but do not cool the user too much or too little. Apart from that, the system must also create a pleasant climate both in the summer and the winter. Therefore, a need exists for technical solutions which appropriately meet one or more of these requirements.

SUMMARY OF THE INVENTION

Based on this, a technical concept is proposed with the features of claim 1. Additional advantageous embodiments can be gleaned from the additional claims and the specification that follows.

Accordingly, pursuant to one aspect of the present invention, there is contemplated an Air conditioner (20) with at least one air conduction device (21), characterized in that the air conditioner (20) in a first operating state has air passing at least partially through it in a first direction, that the air conditioner (20) has air flowing through it at least partially in a second direction different from the first direction, and that the air conditioner (20) has at least one switching device (23), to alter the flow direction of the air in the air conduction device (21).

The invention may be further characterized by one or any combination of the features described herein, such as the Air conditioner (20) has at least one air feeder (22), that the air feeder (22) preferably is a fluid flow device, and that the switching device (23) makes possible a change in the flow direction of the air in the air conduction device (21), without altering the discharge direction of the air feeder (22) and/or the rotational direction of the fluid flow device; the switching device (23) has an automatic, and especially an electronic control device and/or a manually operable switch (231) to switch the flow-through direction from at least a first into at least a second operating status; the Air-conditioned object (10) is located in a vehicle (100) and/or a seat (11) for a vehicle.

Accordingly, pursuant to another aspect of the present invention, there is contemplated a Procedure for operating an air conditioner (20), characterized in that in a first operational state, the air conditioner (20) has air flowing through it at least partially in a first flow-through direction, that in a second operational state, the air conditioner (20) has air flowing through it at least partially in a second flow-through direction differing from the first direction, and that the operational state is adjusted in dependence on the identity of a user, his prior choice, an operational state of an onboard air conditioner, the ambient temperature, and/or the seat surface temperature, the temperature of the air brought in by suction or discharged from an air feeder (22).

The invention may be further characterized by one or any combination of the features described herein, such as the air feeder (22) blows air into the air conduction device (20) if at least one of the temperature values named in above lies above a determined target value, that the air feeder (22) takes air out of the air conduction device (20) by suction, if at least one of the temperature values named above lies below a certain, possibly other, target value, and/or that at the start and/or at the end of the operating time, the air conditioner (20) switches back to a preset operational status.

FIGURES

In what follows, the particulars of the invention are explained. These explanations should make the invention understandable. However, they are only exemplary in nature. Naturally, within the framework of the invention, individual or multiple features described can also be omitted, altered or supplemented. Also, the features of various embodiment forms can naturally be combined with each other. What is decisive is that the invention in essence is implemented. If one feature is at least partially fulfilled, then this includes the feature also being completely fulfilled, or in its essentials being completely fulfilled. "In its essentials" especially means that the implementation permits achievement of the desired benefit to a recognizable extent. This can mean especially that a feature in question is fulfilled at least 50%, 90%, 95% or 99%. If a minimum amount is indicated, then naturally more than this minimum amount can be used. What is described for one object can also be applied to the preponderant part or the totality of all other objects identical in type. If nothing else is indicated, intervals include their edge points.

In what follows reference is made to.

DETAILED DESCRIPTION OF THE INVENTION

At least one object 10 to be air conditioned is equipped with at least one zone 30 to be air conditioned, which is temperature-controlled dehumidified and/or ventilated via an air conditioner 20. This especially includes surfaces with which a passenger makes contact, such as surfaces of a seat, a switching device, a steering wheel, and others.

At least one object 10 to be air-conditioned preferably is assigned to an air conditioner 20, and especially is equipped with it.

Figure 1:
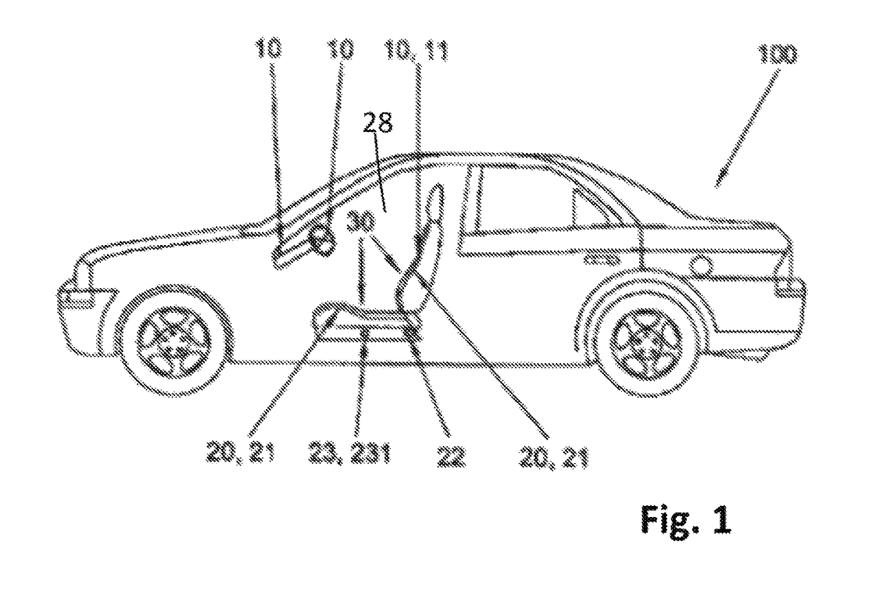
FIG. 1 is a side view of a vehicle with a seat with an air conditioner.

In the embodiment example shown in FIG. 1, an object 10 to be air-conditioned in the form of a seat 11 is preferably equipped with at least one air conduction device 21 for a seat back and at least one additional air conduction device 21 for a seat bolster (seat cushion).

At least one air conduction device 21 includes an at least partial housing that is preferably at least partially manufactured from an air-permeable layer 211, which is at least partially covered by an enveloping layer 212, to avoid or to reduce escape of air from the air conduction device 21 outside the zones 30 to be air-conditioned. In one operating state, air flows into and fills the air conduction device 21 from an air outlet 22a of the air feeder 22, the air then flows into a cabin of a vehicle. In another operating state, air flows into and fills the air conduction device from the cabin of a vehicle and then flows to the air feeder 22.

At least one air conditioner 20 is preferably equipped with an air feeder 22, which brings air from a zone 30 to be air conditioned and/or to it. This especially includes fans, preferably radial fans. They are appropriately between one and five in number per object to be air-conditioned, preferably between and two per surface to be air-conditioned, especially one and two per seat, preferably one for a seat bolster (seat cushion) and the other for a seat back.

At least one air conditioner 20 is preferably equipped with at least one air conduction device 21, which at least brings air away from at least one air feeder 22 or to it, and/or away from the zone 30 to be air-conditioned or to it. This especially includes hoses or channels.

At least one air conditioner 20 is preferably equipped with at least one switching device 23, which can alter, and especially reverse, the flow direction of air conducted in the air conduction device 21, at least in partial sections of the air conduction device 21. It is advantageous if they are between one and two in number per seat 11, better one and two per surface 30 to be air-conditioned or per air feeder 22.

At least one air feeder 22 is preferably situated on, in or at an object 10 to be air-conditioned. It can, for example, be mounted on or beneath a seat 11 or on or in a seat back.

At least one air feeder 22 is preferably equipped with at least one air outlet 22 a and with at least one air inlet 22 b.

At least one switching device 23 is preferably at least partially situated between at least one air feeder 22 and at least one air conduction device 21. This does not necessarily relate to its spatial position, but rather to its placement in the air flow between air conduction device 21 and air feeder 22. Preferably it is at least partially situated on a surface of seat 11, especially on the front or side of the seat bolster and/or its support structure.

Preferably at least one switching device 23 is equipped with at least one intake suction device 232, which at least occasionally can guide from at least one air conduction device 21 and/or the surroundings to at least one air inlet 22 b of an air feeder 22. This especially includes a hose-shaped or plate-like channel, via which air can be blown into air conduction device 21.

Preferably at least one switching device 23 is equipped with at least one intake blower 232, which at least occasionally can guide air from at least one air outlet opening of an air feeder 22 to the surroundings and/or to at least one air conduction device 21. It can be configured in the same manner as intake device 232.

Preferably at least one switching device 23 is equipped with at least one switch 231, which switches an intake suction device 232 and/or an injection blower 233, especially closing it or releasing it for through-passing flow. Especially included in this are flaps, plates, disks, or ball valves capable of being turned, tipped or slid. Sliding switching elements are especially advantageous because they take up little space. It is especially advantageous if a common switch 231 is provided, to switch the air flow both into at least one intake suction device 232 or also at least into one blower intake 233, preferably simultaneously and/or through this same switching-operating motion and/or the same operating impulse.

Figure 2A:
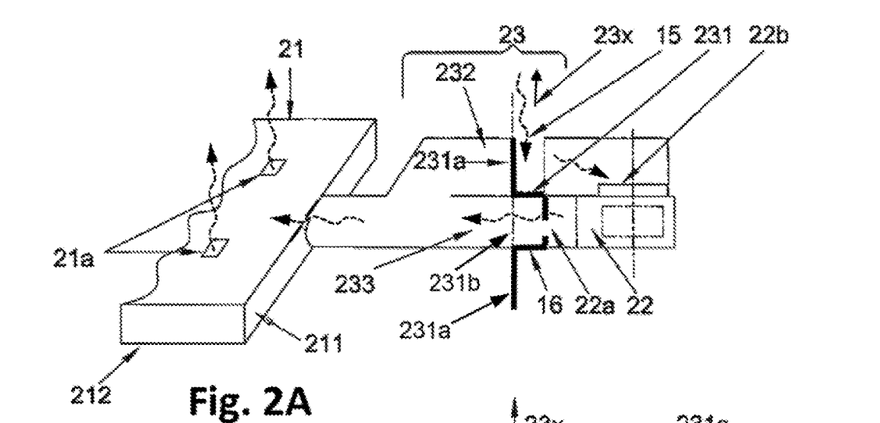
FIG. 2A is a perspective view of a first form of a switching device for switching the flow direction in an air conditioner.
Figure 2C:
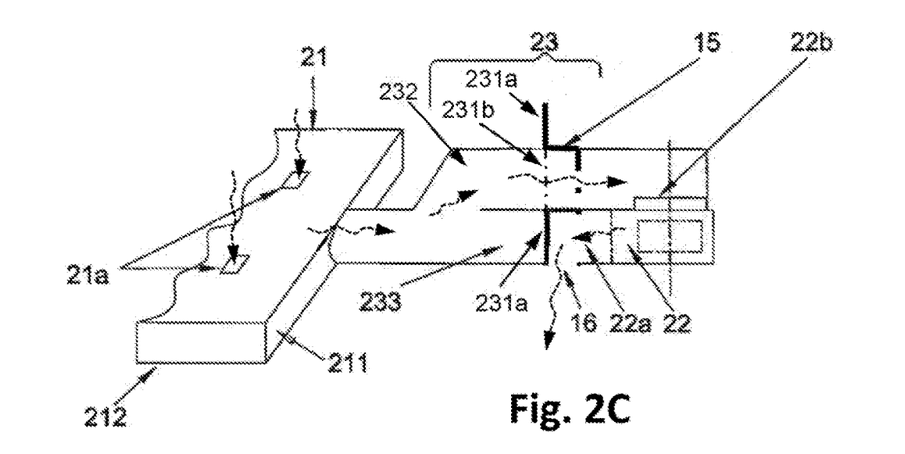
FIG. 2C is a perspective view of a second form of a switching device for switching the flow direction in an air conditioner.
Figure 3A:
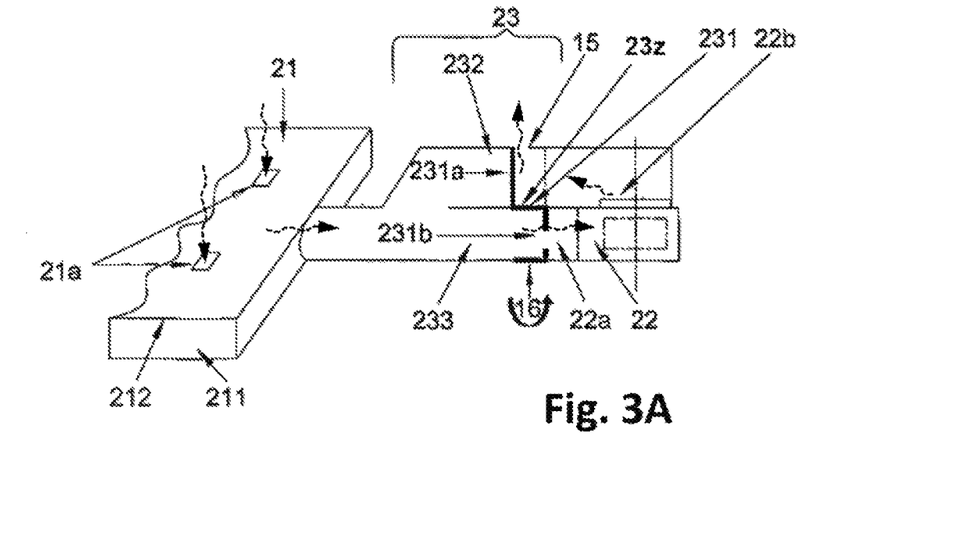
FIG. 3A is a perspective view of a second form of a switching device for switching the flow direction in an air conditioner.

At least one switch 231 preferably has a closing device 231 a, which closes an intake suction device 232 and/or a blower intake 233. Both in the embodiment form of FIG. 2 and also in that of FIG. 3, this is implemented by a plate-shaped section, which closes an opening of the suction intake 232 and/or a blower intake 233.

In addition, at least one switch 231 has a passageway device 231 b. This passageway device 231 b preferably is configured so that the air flowing through can pass through an opening 231 b' from an intake suction device 232 and/or an intake blower device 233 into an air inlet 22 a and/or an air outlet 22 b of an air feeder 22. At the same time, the passageway device 231 b has a channel-shaped section that minimizes escape of air during this passage. In the embodiment forms of FIGS. 2 and 3, the passageway device 231 b is formed by a tube section, which connects the air duct 21 with the air feeder 22, preferably in the form of a plastic pipe of rectangular cross section.

Preferably the closing device 231 a and the passageway device 231 b are structurally connected to each other, so that by means of the same adjustment movement they can both be switched simultaneously. With the embodiment form of FIG. 2, the switch 231 is formed by a rectangular plate, which has a tube-like plate with a passageway opening 231 b' in its middle. This plate can be switched between two operating states by sliding in a direction 23 x. In a first condition as depicted in FIG. 2, the air conduction device 21 is connected via an intake blower 233 and a passageway device 231 b of a switch 231 with the air outlet 22 a of an air feeder 22. The air inlet 22 b of air feeder 22 is connected with the surroundings via an air inlet opening 15. Via this air inlet opening 15, air is brought by suction into air inlet opening 22 b of air feeder 22. Then it is blown in via air outlet opening 22 a and passageway device 231 b into intake blower 233 and air conduction device 21. It then flows to air passageway openings 21 a and out to the user. While this is occurring, suction intake device 232 of air conduction device 21 is closed by a closing device 231 a.

For setting a second operating status shown in FIG. 2C, switch 231 is slid along a direction 23 x. By this means, a closing device 231 a is positioned in front of intake blower 233 of air conduction device 21, and closes it. The passageway device 231 b is switched between an intake suction device 232 of air conduction device 21 and an air inlet 22 b of air conduction device 21. Air is thereby free to pass through intake suction device 232. The air intake opening 15 is closed, so that air feeder 22 brings no more ambient air in by suction. At the same time, a previously closed air outlet opening 16 is opened, through which the air feeder 22 can release air to the surroundings. The air now flows to the air passageway openings 21 a into air conduction device 21. Via the intake suction device 232, it is further guided to air inlet 22 *b* and air feeder 22. From there it flows via the air outlet opening 16 into the surroundings.

Figure 2B:
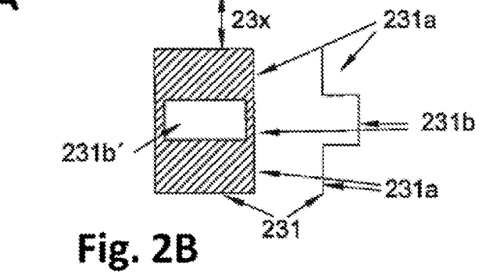
FIG. 2B is a cross-sectional view of a switch for activating the switching device of FIG. 2A and FIG. 2C.
Figure 3B:
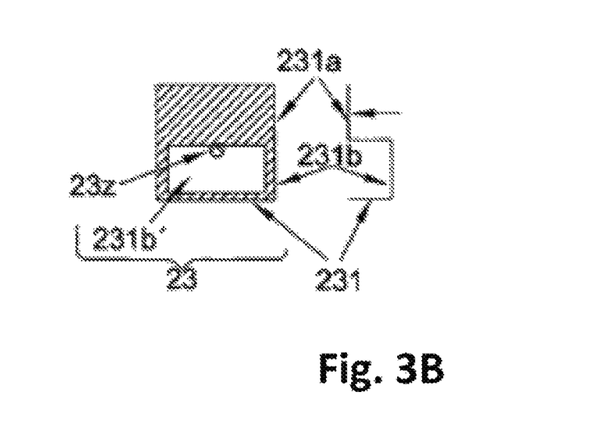
FIG. 3B is a cross-sectional view of a switch for activating the switching device of FIG. 3A.
Figure 4:
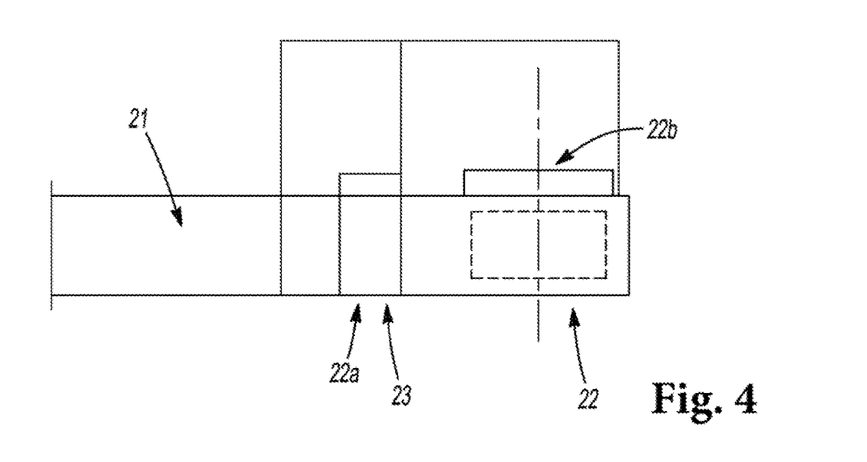
FIG. 4 is a longitudinal section through a third, manually operable embodiment form of a switching device.
Figure 5A:
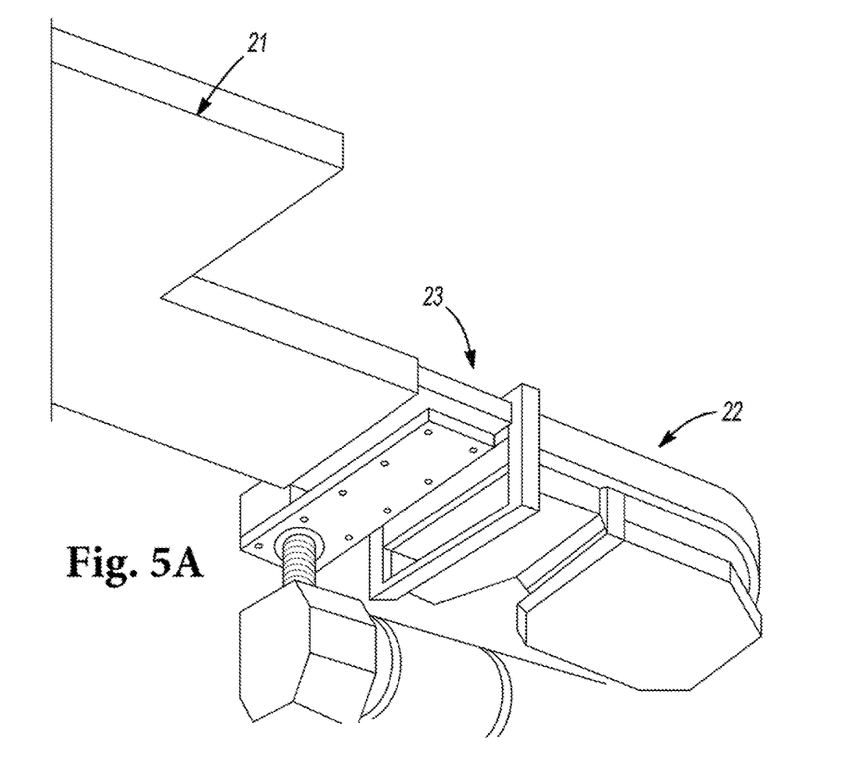
FIG. 5A is a perspective view from below of a fourth electrically switched embodiment form of a switching device.
Figure 5B:
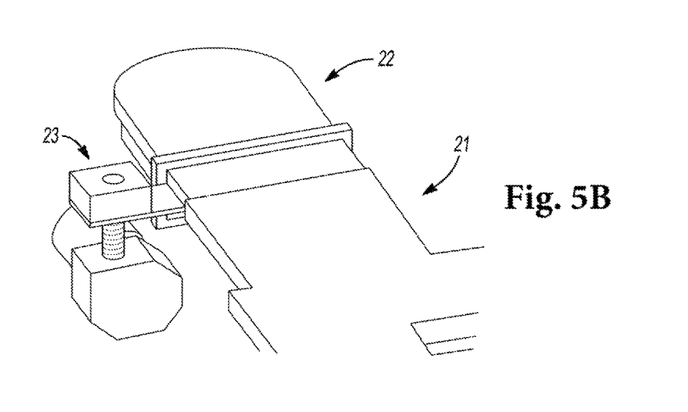
FIG. 5B is a perspective view from above of the embodiment of FIG. 5A.

The embodiment form of FIGS. 3*a* and 3*b* in essence matches that of FIGS. 2*a* and 2*b*. Here, however, the adjustment movement of switch 232 is not a linear sliding. Rather, closing device 231 *a* and passageway 231 *b* are changed, by having switch 231 turn about an axis 23 *z*. In the present embodiment example, the turning axis lies in the center between intake suctioning device 232 and intake blower 233.

With the embodiment of FIG. 4, FIGS. 5A and 5B, and FIGS. 6A and 6B, the switching device is implemented so that depending on the operating state, the air conduction device 21 couples to the intake blower 233 or to the intake suction device 232. With this, no need exists to close the passageway opening that has just been decoupled.

Figure 6A:
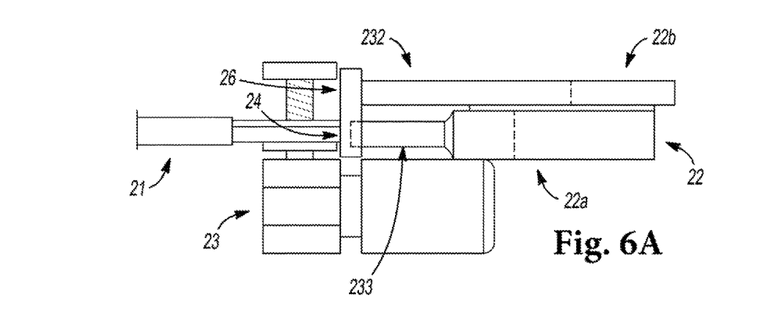
FIG. 6A is a side view of the embodiment of FIG. 5A.
Figure 6B:
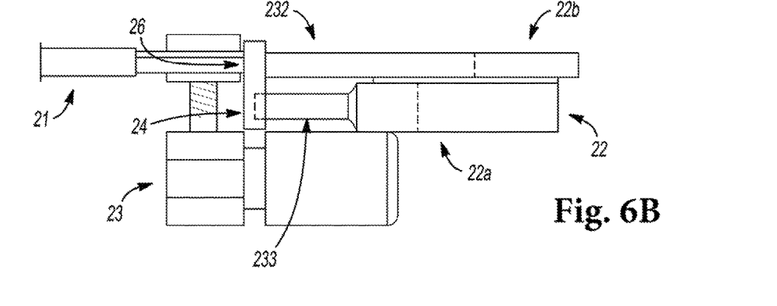
FIG. 6B is a side view of the embodiment of FIG. 5A.

FIG. 6A illustrates the air conditioner in the first operating state and FIG. 6B illustrates the air conditioner in the second operating state. The air conditioner includes an air conduction device 21, an air feeder 22 in communication with the air condition device 21, and a switching device 23 in communication with the air condition device 21. The air feeder 22 includes an air outlet 22*a* and an air inlet 22*b*. The switching device 23 includes an intake blower device 233 and intake suction device 232. The intake blower device 233 leads air from the air outlet 22*a* to the air condition device 21. The intake suction device 232 leads air from the air condition device 21 to the air inlet 22*b* of the air feeder 22.

In the first operating state illustrated in FIG. 6A, the switching device 23 moves the air conduction device 21 and couples the air conduction device 21 to an opening 24 of the intake blower device 233 without closing an opening 26 of the intake suction device 232 so that air blown from the air feeder 22 flows into and fills the air condition device 21 and then flows into the cabin 28 of the vehicle 100 (FIG. 1).

In the second operating state illustrated in FIG. 6B, the switching device 23 moves the air conduction device 21 and couples the air conduction device 21 to an opening 26 of the intake suction device 232 without closing the opening 24 to the intake blower device 233 so that air from the cabin 28 of the vehicle 100 (FIG. 1) flows into and fills the air conduction device 21 and then flows into the air feeder 22.

Provision can be made that the switching device 23 and/or the switch 231 be electrically controlled, thus with automatic motion and coupling of the air conduction device 21. Provision also can be made that a signal transmitter be provided to pass signals between an electronic controller, an operating element and the switching device 23 and/or the switch 231.

Provision can be made that the switching device 23 or the switch 231 be switched as per a preset algorithm. Provision can also be made that at the beginning or at the end of an operation by the air conditioner 20, the switching device is switched to a defined starting or ending status.

LIST OF REFERENCE SYMBOLS

10 Object to be air conditioned
11 seat
12 Air intake opening
16 Air outlet opening
20 Air conditioner
21 Air conduction device
21 *a* Air passageway device
22 Air feeder
22 *a* Air outlet
22 *b* Air inlet
23 Switching device
23 *x* Direction
23 *z* Axis
30 Zones to be air-conditioned
100 Vehicle
211 Air-permeable layer
212 Enveloping layer
231 Switch
231 *a* Closing device
231 *b* Passageway device
231 *b'* Passageway opening
232 Intake suction device
233 Intake blower

The invention claimed is:

1. An article comprising:
   an air conditioner located within an object to be air-conditioned within a cabin of a vehicle, the air conditioner operating in a first operating state and in a second operating state, the air conditioner comprising:
   i. at least one moveable air conduction device,
   ii. at least one air feeder in communication with the at least one air conduction device, the at least one air feeder including an air outlet and an air inlet, and
   iii. at least one switching device in communication with the at least one air conduction device, the at least one switching device comprising:
      a. an intake blower device leading air from the air outlet of the at least one air feeder to the at least one air conduction device, and
      b. an intake suction device leading air from the at least one air conduction device to the air inlet of the at least one air feeder,
   wherein the air conditioner is switchable between the first operating state and the second operating state,
   wherein in the first operating state, the at least one switching device moves the at least one air conduction device and couples the at least one air conduction device to an opening of the intake blower device without closing an opening of the intake suction device so that air from the at least one air feeder flows into and fills the at least one air conduction device, the air then flows into the cabin of the vehicle, and
   wherein in the second operating state, the at least one switching device moves the at least one air conduction device and couples the at least one air conduction device to the opening of the intake suction device without closing the opening of the intake blower device so that air from the cabin of the vehicle flows into and fills the at least one air conduction device, the air then flows into the at least one air feeder, and
   wherein the air conduction device comprises a housing having an air permeable layer through which the air from the at least one air feeder flows into the cabin of the vehicle in the first operating state and through which the air flows into the at least one air conduction device from the cabin of the vehicle in the second operating state.

2. The article according to claim 1, wherein the object is a vehicle seat.

3. A method comprising:
   operating an air conditioner in a first operating state and in a second operating state,
   alternating between the first operating state and the second operating state with at least one switching device that is located between at least one air conduction device and an air feeder, the at least one switching device comprising an intake blower device and an intake suction device, the at least one air conduction device comprises a housing,
adjusting between the first operating state and the second operating state depending on one or more variable values, the one or more variable values are: identity of a user, a prior choice of the user, an operating state of an onboard air conditioner, an ambient temperature, a seat surface temperature, a temperature of air brought in by suction or discharged from the air feeder;
wherein in the first operating state, the at least one switching device moves the at least one air conduction device into fluid communication with an opening of the intake blower device without closing an opening to the intake suction device so that air flows into and fills the at least one air conduction device and then flows through the at least one air conduction device towards the user,
wherein in the second operating state, the at least one switching device moves the at least one air conduction device into fluid communication with the opening of the intake suction device without closing the opening to the intake blower device so that air flows away from the user and into the at least one air conduction device and fills the at least one air conduction device,
wherein in the first operating state, the air is blown out of the air outlet of the at least one air feeder towards the user;
wherein in the second operating state, the air is blown out of the air outlet of the at least one air feeder to atmosphere.

4. The article according to claim 1, wherein the cabin is a cabin of a closed-cabin vehicle.

5. The article according to claim 1, wherein
in the first operating state, ambient air from the surroundings flows into the air inlet of the at least one air feeder by suction, and
in the second operating state, air from the object to be air-conditioned flows into the air inlet of the at least one air feeder by suction.

6. The article according to claim 1, wherein
in the first operating state, air is blown into the object to be air-conditioned from the air outlet, and
in the second operating state, air from the object to be air-conditioned is blown to atmosphere from the air outlet.

7. The article according to claim 1, wherein the at least one switching device moves the at least one air conduction device in response to a preset algorithm.

8. The article according to claim 1, wherein the object to be air-conditioned is a seat cushion, a backrest cushion, or both, and
wherein the at least one air feeder is located at least partially on, in, at, or a combination thereof the seat cushion, the backrest cushion, or both.

9. The article according to claim 1, wherein the at least one air feeder is a fluid flow device, and
wherein the at least one switching device moves the at least one air conduction device without altering a discharge direction, a rotational direction, or both of the fluid flow device.

10. The article according to claim 9, wherein the at least one switching device has an automatic electronic control device, a manually operable switch, or both to move the at least one air conduction device between the first operating state and the second operating state.

11. The article according to claim 9, wherein the at least one air feeder is a radial fan.

12. The article according to claim 9, wherein the air-permeable layer is at least partially covered by an enveloping layer so that an escape of air from the air conduction device outside of zones to be air-conditioned is avoided.

13. The method according to claim 3, wherein the at least one air feeder blows air into the at least one air conduction device in a first flow-through direction if at least one of the variable values lies above a determined target value, and
wherein the at least one air feeder takes air out of the at least one air conduction device by suction in a second flow-through direction if at least one of the variable values lies below a certain, possibly other, target value; the air conditioner switches back to a preset operating status at a start of an operating time, at an end of the operating time, or both; or a combination thereof.

14. The method according to claim 3, wherein the method comprises the steps of:
drawing ambient air from the surroundings via suction into the air inlet of the at least one air feeder in the first operating state, and
drawing air from an object or area air conditioned via suction into the air inlet of the at least one air feeder in the second operating state.

15. An article comprising:
an air conditioner located within an object to be air-conditioned within a cabin of a vehicle, the air conditioner operating in a first state and a second state, the air conditioner comprising:
i. an air conduction device,
ii. an air feeder in communication with the air conduction device, the air feeder including an air outlet and an air inlet, and
iii. a switching device in communication with the air conduction device, the switching device comprising:
a. an intake suction device including an opening that is in fluid communication with both the air conduction device and the air inlet of the air feeder in the first state so that air can be moved from the cabin of the vehicle to the air feeder;
b. an intake blower device including an opening that is in fluid communication with both the air conduction device and the air outlet of the air feeder in the second operating state so that air can be moved from the air feeder to the cabin of the vehicle; and
c. a switch,
wherein the air conditioner is switchable between the first operating state and the second operating state,
wherein when switching between the first operating state and the second operating state, the switch is slid along an axis that is generally perpendicular to movement of air between the air feeder and the cabin of the vehicle,
wherein the switch comprises a plate-like structure having a structurally connected passageway and closing device so that when the switch is slid along the axis, the air conditioner is simultaneously switched between the first operating state and the second operating state,
wherein in the first operating state, the closing device covers the opening of the intake blower device and the passageway is generally aligned with the opening of the intake suction device so that the air is moved from the cabin of the vehicle into the air conduction device to fill the air conduction device and then the air is moved to the air feeder, and
wherein in the second operating state, the closing device covers the opening of the intake suction device and the passageway is generally aligned with the opening of the intake blower device so that the air is moved from the air feeder into the air conduction device to fill the air conduction device and then the air is moved to the cabin of the vehicle, wherein the air conduction device includes a housing comprising an air permeable layer through which the air from the cabin of the vehicle flows into the air conduction device in the first operating state and through which the air flows into the air conduction device from the air feeder in the second operating state.

* * * * *

UNITED STATES PATENT AND TRADEMARK OFFICE
CERTIFICATE OF CORRECTION

PATENT NO. : 9,815,347 B2
APPLICATION NO. : 12/725942
DATED : November 14, 2017
INVENTOR(S) : Jonathan Zhang It is certified that error appears in the above-identified patent and that said Letters Patent is hereby corrected as shown below:

On the Title Page

Item (56) References Cited

U.S. Patent Documents, delete cited reference "3,127,934"

Foreign Patent Documents, delete cited reference "DE 411375"

Page 2, Foreign Patent Documents, delete cited reference "EP 1078984"

Signed and Sealed this
Twentieth Day of February, 2018

Andrei Iancu
*Director of the United States Patent and Trademark Office*